United States Patent Office 2,767,071
Patented Oct. 16, 1956

2,767,071

HERBICIDAL COMPOSITIONS

Henry L. Morrill, Clayton, Mo., assignor to Monsanto Chemical Company, St. Louis, Mo., a corporation of Delaware No Drawing. Application February 15, 1954,
Serial No. 410,455

14 Claims. (Cl. 71—2.6)

This invention relates to new and useful hormone type herbicide compositions, particularly the chlorophenoxyacetic acid derivatives, and aqueous concentrates containing them. More specifically, the invention relates to improved mixtures of the amine salts of chlorine substituted phenoxyacetic acids, and to water solutions thereof useful as herbicides.

In the manufacture and commercial sale of hormone type herbicides it has been found desirable to formulate them in concentrated solution form for ready use by the consumer. In general these concentrated solutions require only dilution or dispersion in water for the preparation of application strength herbicidal compositions. It is common practice to prepare concentrates with as much active ingredient as possible in order to minimize the cost of transportation. Due to the limited solubility of the various amine salts of the chlorine substituted phenoxyacetic acids, it is frequently impossible to prepare the aqueous formulations of the desired concentration. The choice of the amine used in the salt formation has a pronounced effect on the solubility of the chlorophenoxyacetic acid amine salts.

The low cost and general availability of isopropyl derivatives makes isopropylamine a useful raw material for the preparation of amine salts of the phenoxyacetic acids, but the relative insolubility of these salts is such as to make them of little value for the preparation of aqueous concentrates. An examination of the solubility temperature relationships of the isopropylamine salt of 2,4-dichlorophenoxyacetic acid will demonstrate the phenomenon involved.

The aqueous concentrates are conventionally described in terms of the saturation temperature of solutions containing a certain number of pounds per gallon of the herbicide on the basis of the phenoxyacetic acid portion of the molecule. The following table shows the "solution points" or the minimum temperature at which various solutions will be stable to the crystallization of the dissolved isopropylamine salt.

| Lbs. per gallon | Solution point, ° C |
|---|---|
| 4 | 22 |
| 5 | 29 |
| 6 | 47 |

This shows the lack of general utility of isopropylamine in the preparation of aqueous herbicide concentrates. It will be apparent that if the amine salt is to be transported or stored, even in areas of mild climates, solutions of less than 4 lbs. per gallon are essential. Similarly, other amine salts have solution points which are too high for general usage, for example the 2,4-dichlorophenoxyacetic acid salt of dimethylamine, which has a six lb. solution point of 16° C., and the corresponding salt of diethanolamine, which has a six lb. solution point of 26° C. Similarly other amine salts prepared from inexpensive and readily available amines cannot be used safely except at 5 lbs. per gallon or less.

To solve this problem the herbicide formulating industry has had to select amine salts which have satisfactory solution points and to avoid the use of the salts of many of the readily available amines. Such choices have inherent disadvantages, because of the invariably higher cost of the more useful amines. For example triethylamine, of which the 2,4-dichlorophenoxyacetic acid salt has a six lb. solution point of between 5 and 10° C., is quite expensive but extensively used in spite of its high cost. At prices prevailing shortly before this application was filed the six lb. solution of the triethylamine cost $20.04 per 100 lbs. of active component, whereas similar salts of the more available but less soluble salts cost $6.00 to $8.00 per 100 lbs.

It is the primary purpose of this invention to provide chlorinated phenoxyacetic acid amine salt compositions which have low solution points at relatively high concentrations. A further purpose is to provide commercially usable herbicide concentrates from inexpensive amines. A still further purpose of the invention is to provide suitable concentrates from the isopropylamine salt of 2,4-dichlorophenoxyacetic acid, which does not crystallize under normal shipping and storage conditions. A still further purpose is to provide commercially satisfactory six pound concentrates of amine salt of 2,4-dichlorophenoxyacetic acid.

In accordance with this invention it has been found that mixtures of the dimethylamine salt of the 2,4-dichlorophenoxyacetic acid and the isopropylamine salt of a 2,4-dichlorophenoxyacetic acid will have desirable low solution points. It is therefore possible to use a mixture of these amine salts and prepare marketable solutions of higher concentrations than can be prepared from the individual salts.

Preferred mixtures of the amine salts will contain from 1 to 5 mole weights of the dimethylamine salts of 2,4-dichlorophenoxyacetic acid for each mole of the isopropylamine salt, but may contain minor amounts of other amine salts, for example up to 3 moles of the salts of the polyalkanolamines wherein the alkanol group has from two (2) to three (3) carbon atoms respectively, for example diethanolamine, triethanolamine, diisopropanolamine, and triisopropanolamine. Two component salt mixtures may contain from 50 to 85 mole percent of the dimethylamine salt of 2,4-dichlorophenoxyacetic acid and from 15 to 50 mole percent of the isopropylamine salt of 2,4-dichlorophenoxyacetic acid. Three component mixtures may contain from 40 to 70 mole percent of the dimethylamine salt of 2,4-dichlorophenoxyacetic acid, from 10 to 40 mole percent of isopropylamine salt of 2,4-dichlorophenoxyacetic acid and up to 40 mole percent of the polyalkanolamine salt of 2,4-dichlorophenoxyacetic acid.

The aqueous concentrates of the mixed amine salts of 2,4-dichlorophenoxyacetic acid of this invention are stable to crystallization at much lower temperatures than are similar concentrates of the isopropylamine salt of 2,4-dichlorophenoxyacetic acid and similar concentrates of the dimethylamine salt of 2,4-dichlorophenoxyacetic acid. In the normal use of the concentrates they are diluted with water to the desired concentration as required for the particular herbicidal use. Generally the dilution to the optimum effective concentration, for example 0.05 to 0.50 weight percent, is accomplished by any of the many methods known to the art.

Further details are set forth by the following example.

Example

Six pound solution points of various amine salts of 2,4-dichlorophenoxyacetic acid and mixtures of amine salts of 2,4-dichlorophenoxyacetic acid were determined by crystallizing the amine salts from a six lbs. per gallon (acid basis) solution by immersion in a Dry Ice acetone bath (—15° C.) and allowing them to warm slowly to room temperature while stirring with a thermometer. The lowest temperature at which a homogeneous solution existed was observed. The solution points of the various amine salts of 2,4-dichlorophenoxyacetic acid and mixtures of amine salts of 2,4-dichlorophenoxyacetic acid are set forth in the following table.

| Salts and Salt Mixtures | Solution Point, °C. |
|---|---|
| Dimethylamine salt of 2,4-dichlorophenoxyacetic acid | 16 |
| Isopropylamine salt of 2,4-dichlorophenoxyacetic acid | 47 |
| Diethanolamine salt of 2,4-dichlorophenoxyacetic acid | 26 |
| Mixture of: 70 mole percent of the dimethylamine salt of 2,4-dichlorophenoxyacetic acid 30 mole percent of the isopropylamine salt of 2,4-dichlorophenoxyacetic acid | 8.5 |
| Mixture of: 56 mole percent of the dimethylamine salt of 2,4-dichlorophenoxyacetic acid 24 mole percent of the isopropylamine salt of 2,4-dichlorophenoxyacetic acid 20 mole percent of the diethanolamine salt of 2,4-dichlorophenoxyacetic acid | 4 |
| Mixture of: 56 mole percent of the dimethylamine salt of 2,4-dichlorophenoxyacetic acid 24 mole percent of the isopropylamine salt of 2,4-dichlorophenoxyacetic acid 20 mole percent of the diisopropanolamine salt of 2,4-dichlorophenoxyacetic acid | 0 |

What is claimed is:

1. A herbicidal composition comprising from 1 to 5 mole weights of the dimethylamine salt of 2,4-dichlorophenoxyacetic acid for each mole weight of the isopropylamine salt of 2,4-dichlorophenoxyacetic acid.

2. An aqueous herbicidal concentrate containing as an active ingredient a mixture of 1 to 5 mole weights of dimethylamine salt of 2,4-dichlorophenoxyacetic acid and 1 mole weight of isopropylamine salt of 2,4-dichlorophenoxyacetic acid.

3. A herbicidal composition containing 50 to 85 mole percent (based on total active component) of the dimethylamine salt of 2,4-dichlorophenoxyacetic acid and from 15 to 20 mole percent of the isopropylamine salt of 2,4-dichlorophenoxyacetic acid.

4. An aqueous herbicidal concentrate containing as an active ingredient a mixture of 50 to 85 mole percent of the dimethylamine salt of 2,4-dichlorophenoxyacetic acid and from 15 to 20 mole percent of the isopropylamine salt of 2,4-dichlorophenoxyacetic acid.

5. A herbicidal composition containing 40 to 70 mole percent of the dimethylamine salt of 2,4-dichlorophenoxyacetic acid, from 10 to 40 mole percent of the isopropylamine salt of 2,4-dichlorophenoxyacetic acid and up to 40 mole percent of a polyalkanolamine salt of 2,4-dichlorophenoxyacetic acid wherein the alkanol radical contains from two (2) to three (3) carbon atoms inclusive.

6. An aqueous herbicidal concentrate containing as an active ingredient a mixture of 40 to 70 mole percent of the dimethylamine salt of 2,4-dichlorophenoxyacetic acid, from 10 to 40 mole percent of the isopropylamine salt of 2,4-dichlorophenoxyacetic acid and up to 40 mole percent of a polyalkanolamine salt of 2,4-dichlorophenoxyacetic acid wherein the alkanol radical contains from two (2) to three (3) carbon atoms inclusive.

7. The composition defined by claim 5 wherein the polyalkanolamine salt is the diethanolamine salt of 2,4-dichlorophenoxyacetic acid.

8. The composition defined by claim 5 wherein the polyalkanolamine salt is the triethanolamine salt of 2,4-dichlorophenoxyacetic acid.

9. The composition defined by claim 5 wherein the polyalkanolamine salt is the diisopropanolamine salt of 2,4-dichlorophenoxyacetic acid.

10. The composition defined by claim 5 wherein the polyalkanolamine salt is the triisopropanolamine salt of 2,4-dichlorophenoxyacetic acid.

11. The concentrate defined by claim 6 wherein the polyalkanolamine salt is the diethanolamine salt of 2,4-dichlorophenoxyacetic acid.

12. The concentrate defined by claim 6 wherein the polyalkanolamine salt is the triethanolamine salt of 2,4-dichlorophenoxyacetic acid.

13. The concentrate defined by claim 6 wherein the polyalkanolamine salt is the diisopropanolamine salt of 2,4-dichlorophenoxyacetic acid.

14. The concentrate defined by claim 6 wherein the polyalkanolamine salt is the triisopropanolamine salt of 2,4-dichlorophenoxyacetic acid.

References Cited in the file of this patent

UNITED STATES PATENTS 2,590,815    Dosser et al.    Mar. 25, 1952
2,606,830    Kamlet    Aug. 12, 1952

OTHER REFERENCES

McNew et al.: "The Growth Regulant Herbicidal and Physical Properties of 2,4-D and Related Compounds," Iowa State College Journal of Science, vol. 24, No. 2, January 1950, pages 189 to 208 incl.